United States Patent
Williams

(10) Patent No.: US 7,899,271 B1
(45) Date of Patent: Mar. 1, 2011

(54) SYSTEM AND METHOD OF MOVING TARGET BASED CALIBRATION OF NON-UNIFORMITY COMPENSATION FOR OPTICAL IMAGERS

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 783 days.

(21) Appl. No.: 11/778,391

(22) Filed: Jul. 16, 2007

Related U.S. Application Data

(63) Continuation-in-part of application No. 10/941,203, filed on Sep. 15, 2004, now Pat. No. 7,463,753.

(51) Int. Cl.
*G06K 9/32* (2006.01)

(52) U.S. Cl. .................. 382/284; 382/274; 382/275; 382/282

(58) Field of Classification Search .............. 382/260, 382/274, 275, 282
See application file for complete search history.

(56) References Cited

U.S. PATENT DOCUMENTS

| | | | |
|---|---|---|---|
| 5,129,595 A | 7/1992 | Thiede et al. | |
| 5,185,526 A | 2/1993 | Reitman et al. | |
| 5,420,421 A | 5/1995 | Lindgren et al. | |
| 5,903,659 A | 5/1999 | Kilgore | |
| 5,940,140 A | 8/1999 | Dadourian et al. | |
| 5,978,162 A * | 11/1999 | Behrens et al. | ............... 360/53 |
| 6,021,011 A * | 2/2000 | Behrens et al. | ............... 360/51 |
| 6,175,407 B1 * | 1/2001 | Sartor | .................... 356/71 |
| 6,452,686 B1 * | 9/2002 | Svetkoff et al. | ............ 356/602 |
| 6,750,974 B2 * | 6/2004 | Svetkoff et al. | ............ 356/602 |
| 7,035,475 B1 | 4/2006 | Chen et al. | |
| 2001/0042825 A1 | 11/2001 | Young | |
| 2005/0213845 A1 | 9/2005 | Avinash et al. | |
| 2005/0242268 A1 | 11/2005 | Oakley | |
| 2006/0269155 A1 | 11/2006 | Tener et al. | |

* cited by examiner

*Primary Examiner* — Yosef Kassa
(74) *Attorney, Agent, or Firm* — Eric A. Gifford

(57) ABSTRACT

A system and method for moving target based non-uniformity calibration for optical images. The described approach allows for the use of the same test chamber to perform non-uniformity calibration and moving target tests. The current approach works by scanning a test scene having a target and a background at different intensity levels in an overlapping pattern across the imager FOV and cross-referencing multiple measurements of each pixel of a test scene as viewed by different pixels in the imager; each fully-compensated image pixel sees multiple different scene pixels and each scene pixel is seen by multiple imager pixels. For each fully-compensated imager pixel, an $N^{th}$ order correlation is performed on the measured and estimate pixel response data to calculate the NUC terms. This approach is based on the simple yet novel premise that every fully-compensated pixel in the array that looks at the same thing should see the same thing.

28 Claims, 7 Drawing Sheets

SYSTEM AND METHOD OF MOVING TARGET BASED CALIBRATION OF NON-UNIFORMITY COMPENSATION FOR OPTICAL IMAGERS

CROSS-REFERENCE TO RELATED APPLICATIONS

This application is a continuation-in-part of co-pending U.S. application Ser. No. 10/941,203 entitled "FLIR-to-Missile Boresight Correlation and Non-Uniformity Compensation of the Missile Seeker" and filed on Sep. 15, 2004 now U.S. Pat. No. 7,463,753 and claims priority under 35 U.S.C. 120.

GOVERNMENTAL RIGHTS

This invention was made with Government support under Contract HQ0006-01-C-0001/101616 awarded by the Ballistic Missile Defense Organization. The Government has certain rights in this invention.

BACKGROUND OF THE INVENTION

1. Field of the Invention

This invention relates to the determination of non-uniformity compensation (NUC) terms for optical imagers, and more particularly to a low-cost method of calibrating precision NUC terms based on a moving target.

2. Description of the Related Art

Optoelectronic imagers such as Focal Plane Arrays (FPAs) in the IR, near visible, visible or other bands detect incident radiation and convert it to electrical signals to record an image of a scene. The response of the imager on a pixel-by-pixel basis can change dramatically and non-uniformly over time and based on environmental and operating conditions. These non-uniformities appear as fixed-pattern noise in the recorded images. The purpose of non-uniformity correction; known as 'calibration' if done off-line typically during manufacture or as 'compensation' if done on-line just prior to use of the imager, is to reduce the fixed-pattern noise.

Although arbitrary order non-uniformity compensation (NUC) terms can be computed to correct for non-uniformities, the terms of most interest are typically the offset ($0^{th}$ order term) and the gain ($1^{st}$ order term). The offset terms are relatively unstable, hence are typically compensated in the field just prior to or as the imager is being used. Gain terms are relatively stable and thus are typically calibrated offline, usually at the time of manufacture. In some systems, the gain terms may be 'tweaked' just prior to use. Known techniques for compensating both the offset and gain terms are based on the premise that on-average all pixels should see the same value.

The predominant approach for compensating the offset terms uses a blurred version of the scene created optically, through motion of the imager, or through temporal averaging in the field. Based on this premise, any high spatial frequency components that are detected in the blurred image for each pixel are deemed to be the result of non-uniform pixel response. The blurred image is corrected to remove the high frequency components. The same correction is then applied to the subsequent non-blurred image. This approach is serviceable for relatively "flat" imagery but struggles with scenes which contain significant content at high spatial frequencies. These may be perceived as non-uniformities and "compensated" producing scene and body-motion dependent artifacts.

The predominant approach for calibrating the gain terms is to expose the imager to uniform flood sources at different temperatures. The response of each pixel is taken as the difference value between these two sources to first cancel pixel offsets. A gain term is then calculated for each pixel to flatten the apparent response over the entire imager. The offset terms are discarded but the gain terms are saved to calibrate the imager. Different sets of gain terms may be calibrated for different operating conditions of the imager. A problem with this approach is that the flood measurements are conducted in a separate vacuum test chamber from the moving target tests performed with the calibrated imager. Providing multiple vacuum test chambers and moving the imager between test chambers significantly increases test time and cost.

SUMMARY OF THE INVENTION

The present invention provides a system and method for precision calibration of non-uniformity compensation (NUC) terms including but not limited to the $1^{st}$ order gain terms. The described approach allows for the use of the same test chamber to perform non-uniformity calibration and to perform the moving target tests.

The current approach works by scanning a test scene having a target and a background at different illumination intensity levels in an overlapping pattern across the imager field of view (FOV) and cross-referencing multiple measurements of each pixel of a test scene as viewed by different pixels in the imager; each imager pixel (to be fully compensated) sees multiple different scene pixels and each scene pixel is seen by multiple imager pixels. This approach is based on the simple yet novel premise that every pixel in the array that looks at the same thing should see the same thing.

In an embodiment, a method of non-uniformity calibration (NUC) for a pixilated imager comprises providing a test scene having a target in a background at different intensity levels. Light from the scene is collimated and scanned across the imager FOV to generate a sequence of target images in which the test scene is repeated in an overlapping pattern at different target placements within the imager FOV so that each imager pixel to be fully compensated images at least one target intensity level and at least one background intensity level (and preferably multiples of the nominal target and background levels respectively). The sequence of target images is registered to the target and filtered (e.g. median or weighted average filter of the intensity levels) to form an estimate of the test scene (registered average image). This estimate represents an estimate of the ideal response assuming perfect NUC terms. Since each point on the target is seen by multiple imager pixels, variations in the pixel response tend to cancel out. This cancellation is imperfect but improves with iteration of the process. This estimate is backward mapped to the different target placements in the imager FOV to create an estimated target image for each target image. At this point, each imager pixel to be fully compensated will have associated with it data pairs (target estimate, target measured) for at least one and preferably multiple background scene pixels and at least one and preferably multiple target scene pixels. For each imager pixel, an $N^{th}$ order correlation is performed on the data pairs for different scene pixels to estimate non-uniformity calibration (NUC) terms (typically gain and offset) for each imager pixel such that all fully-compensated imager pixels provide substantially the same response to the same input intensity level. The NUC terms can be applied to the target images and the process repeated to refine the calculation of the NUC terms. Typically, the gain terms will be saved as calibration weights for the imager and the offsets discarded.

In another embodiment, in order to fully compensate pixels near the edge of the imager FOV, the test scene is scanned across and beyond the imager FOV so that the edge pixels image at least one and preferably multiple background and target intensity levels. The sequence of target images will now include 'interior' target images in which the target lies fully within the imager FOV and 'edge' target images in which only a portion of the target (less than the whole target) lies within the imager FOV. These edge target images tend to be more difficult to register accurately and can induce tracking error. Therefore, in one embodiment only the interior target images are used to create the registered average image during the $1^{st}$ and subsequent iterations. Once the NUC terms for the pixels that can be fully-compensated using only the interior target images have converged then the edge target images are registered to the last scene estimate and used to generate NUC terms for all of the fully compensated pixels. This process can be enhanced by keeping track of the variability in the forward mapping (creating the estimate of the test scene) and/or backward mapping (estimating the ideal target images based on that scene estimate) and weighting those fully-compensated imager and/or scene pixels with less variability more heavily. This has the effect of favoring those imager pixels with the most consistent response for estimating scene content during the "forward mapping" and of favoring those scene pixels which are most spatially and temporally consistent in estimating pixel responses during "backward mapping". More specifically, imager pixels are weighted to form the registered average image and scene pixels are weighted when performing the $N^{th}$ order correlation of the data to compute the NUC terms and possibly when performing the variance calculation to determine the imager pixel variability.

In an embodiment, to create the estimate of the test scene during at least the $1^{st}$ iteration each scene pixel is subjected to a non-linear filter such as a median filter that rejects at least some outlier intensity levels. These outlier scene pixels often correspond to bad, dead or blinker imager pixels. Removing these imager pixels up front has been found to speed convergence of the NUC terms. After the $1^{st}$ iteration, an imager pixel stationarity map may be computed based on differences for each imager pixel between the measured and estimated pixel response for different scene pixels and used to assign weights to each imager pixel. In general the weights are inversely proportional to the variance of an imager pixel response. Dead or blinker pixels will typically demonstrate a large variance and be marginalized. The weights are then used to weight the contributions of the imager pixels during the formation of the registered average image (i.e., the scene estimate).

In another embodiment, the estimate of the test scene is spatially masked based on a priori knowledge of the test scene to create the estimated target images. The mask excludes areas of high spatial variability such as transitions between the target and background intensity levels and includes areas of low variability such as the interior of the target and an annular region in the background around the target. The mask effectively sets the weights in the excluded areas to zero and the weights in the included areas to one. Alternately, the mask can be used to explicitly set the weights in the excluded areas to zero and not be directly applied to the image data. For additional refinement, a gradient of the pixel values can be computed for the included areas. If individual pixel gradient values are too high (e.g. exceeds a threshold) they are also excluded. The remaining scene pixels in the included areas can be left with uniform weights or their weights can be assigned by computing the weighted variance at each scene pixel in the estimate of the test scene, i.e. the weighted variance of the registered imager pixels that contribute to each scene pixel, to form a scene pixel stationarity map. These scene pixel weights are then used to weight the contributions of the scene pixels when the $N^{th}$ order correlation is performed to fit the estimated and measured pixel response data for each imager pixel. The weights may also be used to weight the contributions of the difference values when computing the variance for the imager pixel stationarity map.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a system and method for precision calibration of non-uniformity compensation (NUC) terms including but not limited to the $1^{st}$ order gain terms. The described approach allows for the use of the same test chamber to perform non-uniformity calibration and to perform the moving target tests. The current approach works by scanning a test scene having a target and a background at different illuminations in an overlapping pattern across the imager FOV and cross-referencing multiple intensity level measurements of each pixel of a test scene as viewed by different pixels in the imager; each imager pixel to be fully compensated (hereinafter referred to as a "fully-compensated imager pixel") sees multiple different scene pixels and each scene pixel is seen by multiple fully compensated imager pixels. This approach is based on the simple yet novel premise that every pixel in the array that looks at the same thing should see the same thing. Depending upon the application not every imager pixel need be fully compensated e.g. pixels near the edges of the imager, and thus the method of calibration applies to the 'fully-compensated imager pixels' where fully compensated means at least gain compensation and not merely offset compensation. Although designed for calibration at the time of manufacturing, the current approach could be adapted to perform calibration or compensation in the field based on a known moving target, e.g. by scanning the bright moon against black space.

Figure 1:
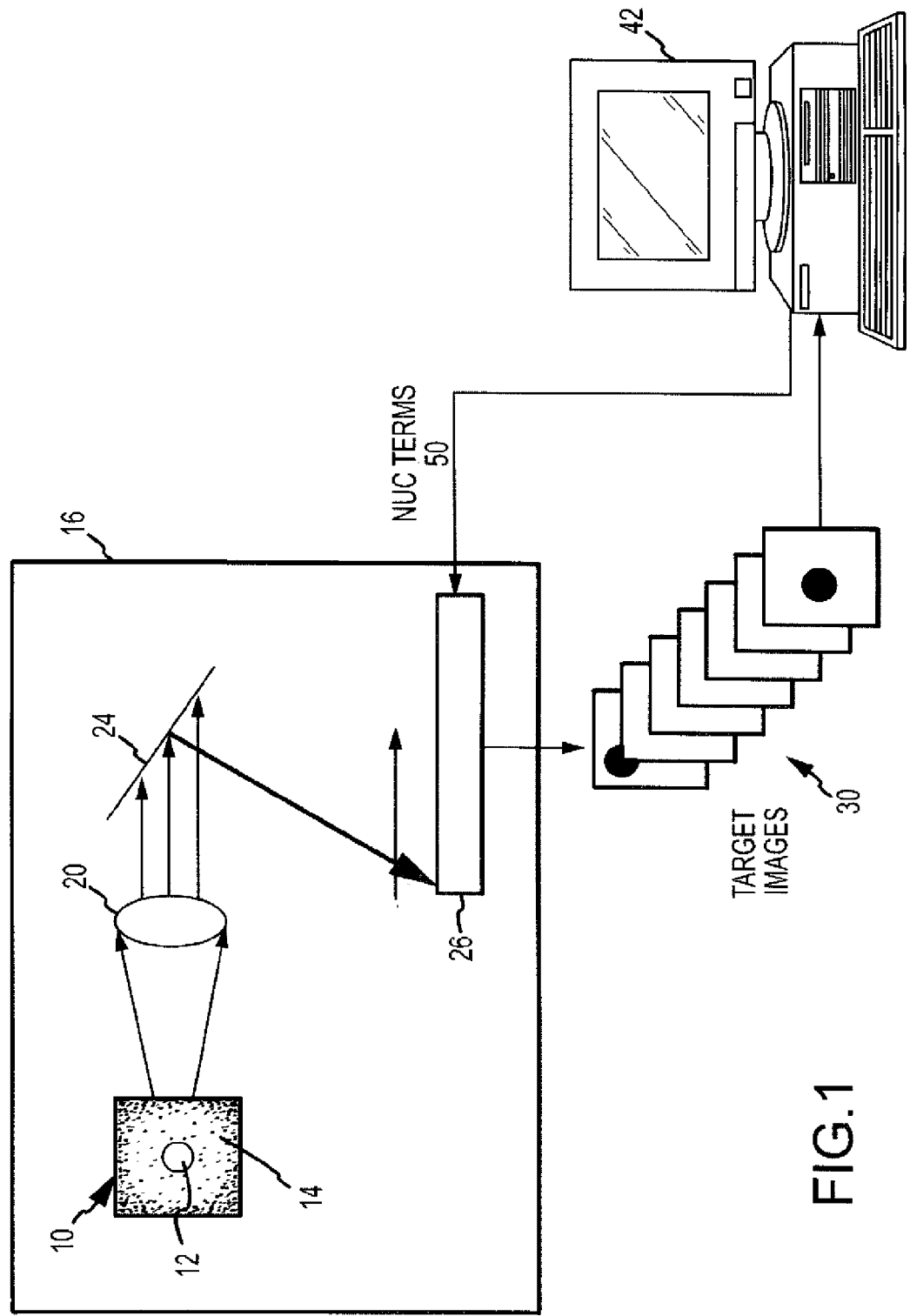
FIG. 1 is a diagram of a test chamber and computer for computing non-uniform calibration (NUC) terms in accordance with the present invention.
Figure 2:
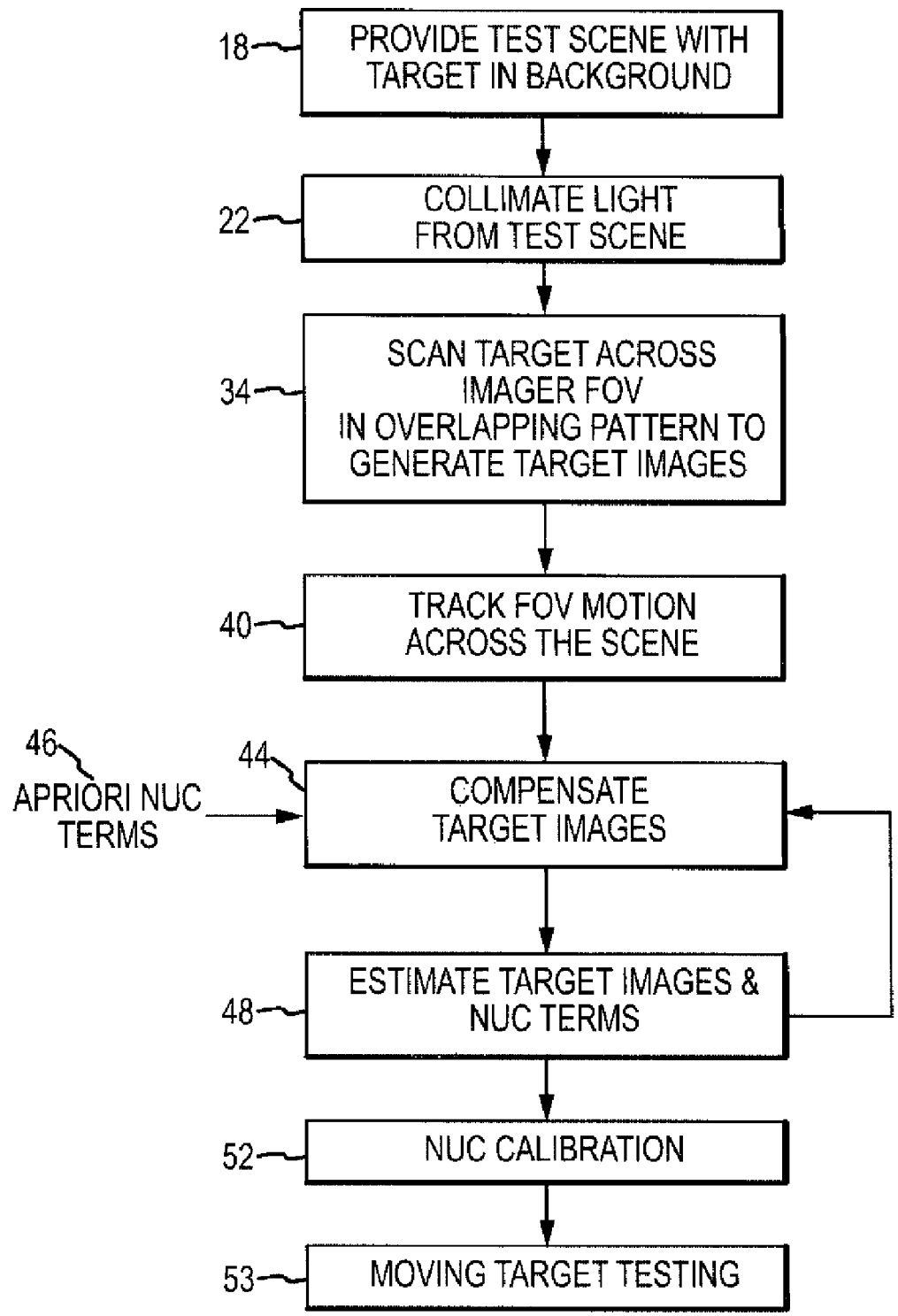
FIG. 2 is a flow diagram of the overall process for computing the NUC terms.
Figure 3:
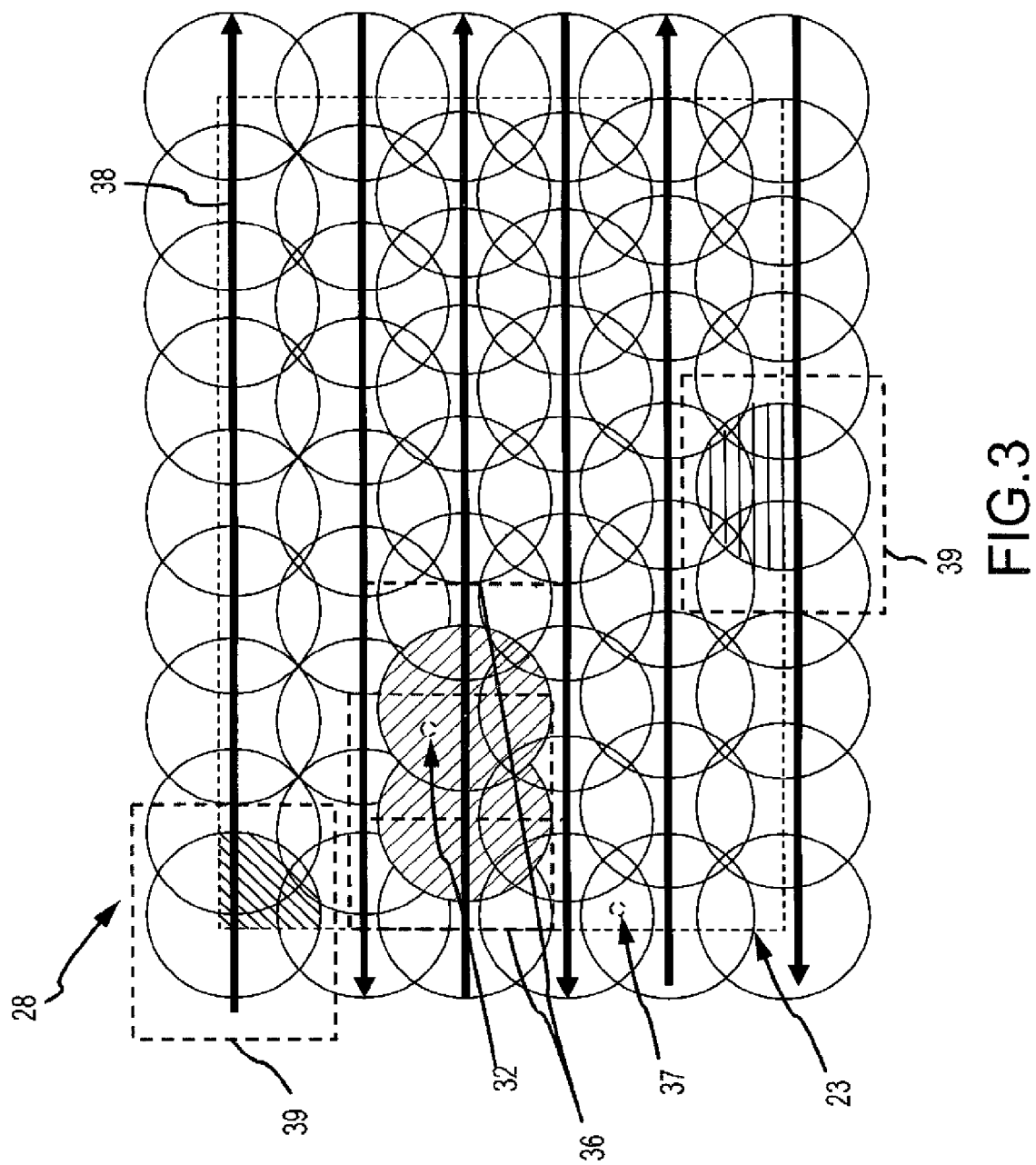
FIG. 3 is a diagram of the overlapping scan of the target onto the imager FOV to generate a sequence of target images.

As shown in FIGS. 1-3, the system and method for precision calibration of NUC terms constitutes providing a test scene 10 having a target 12 with multiple pixels having intensity values in a first range about a nominal target level in a background 14 with multiple pixels having intensity values in a second range about a nominal background level inside a vacuum test chamber 16 (step 18). The nominal target and background intensity levels are different. Test scenes with greater than two different nominal intensity levels and corresponding ranges can be used e.g. to support higher order correlation fits to determine NUC terms. Test scene 10 is typically provided in the test chamber by placing a target slide with a hole over a black-body (thermal source) and cooling the slide to the chamber internal temperature. The cooled slide provides the low background intensity level and the black-body provides the high target intensity level. Ideally the intensity levels would be uniform in each region, in practice they lie within certain regions (tolerances) about a nominal value. Light from the test scene is passed through a collimator 20 (step 22) so that it appears as though the test scene were at a great range, e.g. nominally parallel rays from each point.

A scanning mirror 24 scans the test scene across the field of view (FOV) 23 of an imager 26 to generate a sequence of target images 30 in which the test scene is repeated in an overlapping pattern 28 at different target placements across the imager FOV so that each fully-compensated imager pixel 32 images at least one target intensity level and at least one background intensity level (step 34). The scan pattern or FOV motion 38 across the scene is tracked (step 40). The scan pattern is suitably a standard back-and-forth raster scan, typically sawtooth, or boustraphedonic for somewhat greater efficiency, but can be any pattern that provides the requisite overlap. The preferred amount of scene overlap is actually considerably greater than that depicted in FIG. 3, typically at least 75% to ensure that each fully compensated imager pixel images a plurality of target and background pixels respectively. A minimum criterion of three samples for each of the high and the low areas of the test scene for each fully compensated imager pixel allows for some filtering of outliers during the estimation of NUC terms. Any imager pixels that do not meet a selected criterion are not 'fully-compensated' and thus suitably excluded from the processing.

In a currently preferred embodiment, in order to fully compensate pixels 37 near the edge of the imager FOV 23, the test scene is scanned across and beyond the imager FOV, typically at least 50% of one test scene beyond each edge, so that all pixels image at least one and preferably multiple background and target intensity levels. The sequence of target images will now include 'interior' target images 36 in which the target lies fully within the imager FOV and 'edge' target images 39 in which only a portion of the target lies within the imager FOV. These edge target images tend to be more difficult to register accurately and can induce tracking error. Therefore, in one embodiment only the interior target images 36 are used to create the registered average image during the $1^{st}$ and subsequent iterations. Once the NUC terms for the pixels that can be fully-compensated using only the interior target images have converged then the edge target images 39 are registered to the last scene estimate and used to provide additional pair data to generate NUC terms for all of the pixels.

The sequence of target images 30 is fed to a computer 42 that is configured to compensate each target image (step 44) with a priori NUC terms 46 if any are provided. A priori NUC terms could by typical average offset and gain terms found for similar imagers. The computer processes the sequence of compensated target images to generate a scene estimate, extract estimates of the ideal target images from the scene estimate and fit the measured response data to the corresponding estimates for each imager pixel to provide the NUC terms for the imager (step 48). The computer may output the NUC terms 50, specifically the gain terms, for calibration (step 52) after a single iteration or the computer may apply the NUC terms to the original target images (step 44) and repeat the process one or more times to recalculate the NUC terms. As described above, in the case that the imager FOV is over scanned in order to fully compensate all pixels, the computer may identify and only process 'interior' target images until the last iteration at which time the edge target images are incorporated into the NUC terms that are calculated for all fully compensated imager pixels.

By starting successive iterations with better compensated target images, the computer process provides a better scene estimate, hence better estimates of the ideal target images. As a result, the fit of the estimated response to the measured response of the original target images will produce better NUC terms for each fully-compensated imager pixel. Typically, 5 or 6 iterations are sufficient for the NUC terms to converge to the point of vanishing returns. In principle a smart cutoff could be done based on the degree of change in successive iterations; in practice it has not proven necessary. Note, the processing algorithm could be configured to fit the estimate to the compensated target image to produce residual NUC terms that would be accumulated to provide the full NUC terms. This process is typically sufficient for $0^{th}$ order terms but the gain and higher order terms are more sensitive to error accumulation. Once the NUC terms are provided to calibrate the imager, moving target testing on the imager can be performed in the same test chamber (step 53).

Figure 4:
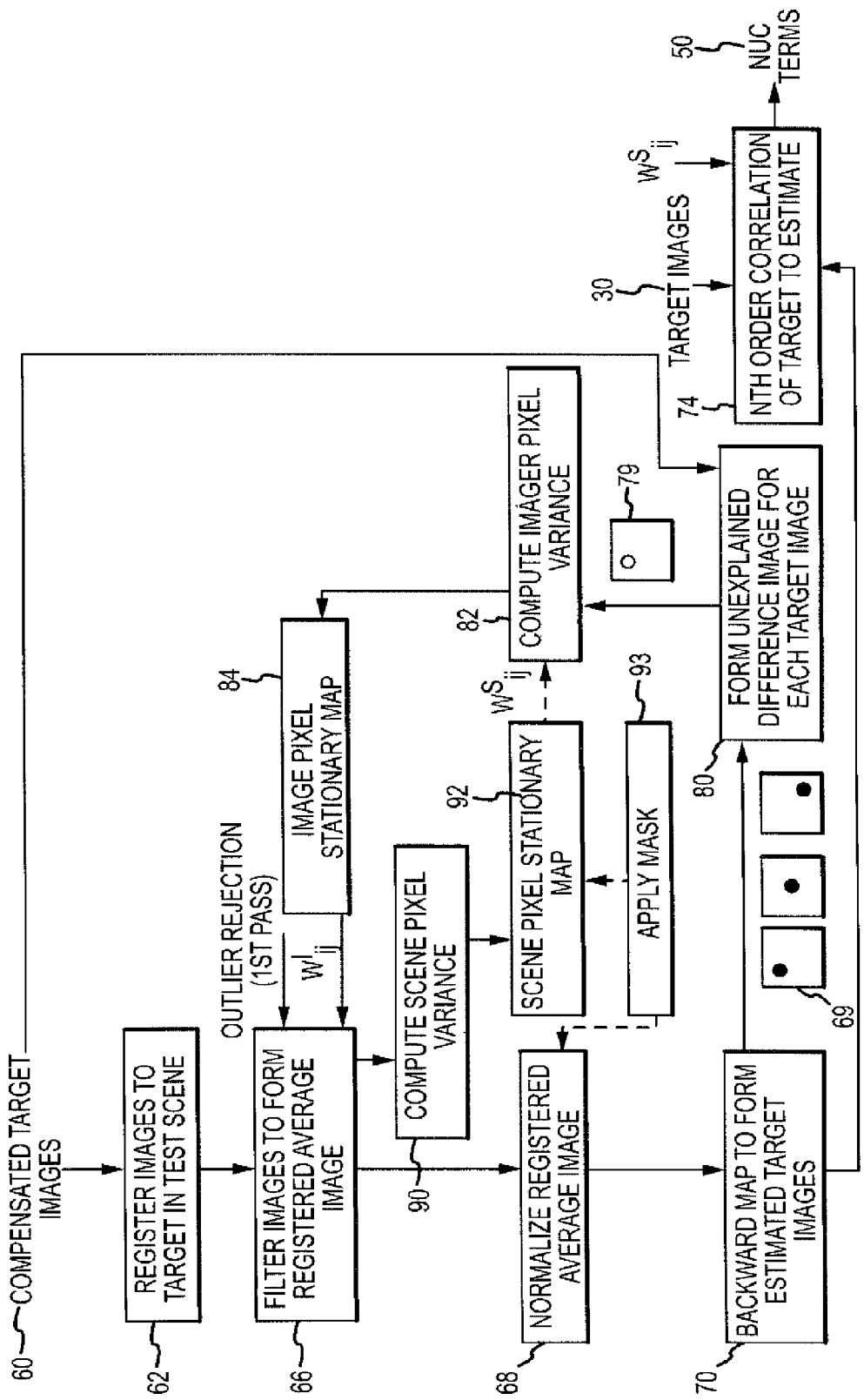
FIG. 4 is a flow diagram of a single iteration of the detailed process for computing NUC terms.
Figure 6:
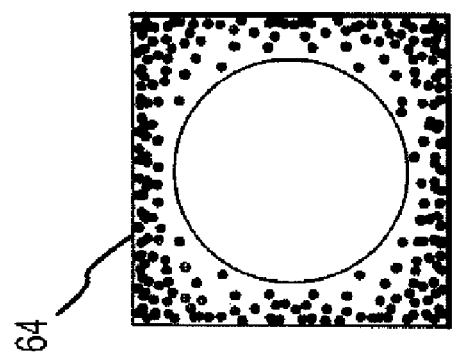
FIG. 6 is a diagram of a registered average image.
Figure 5:
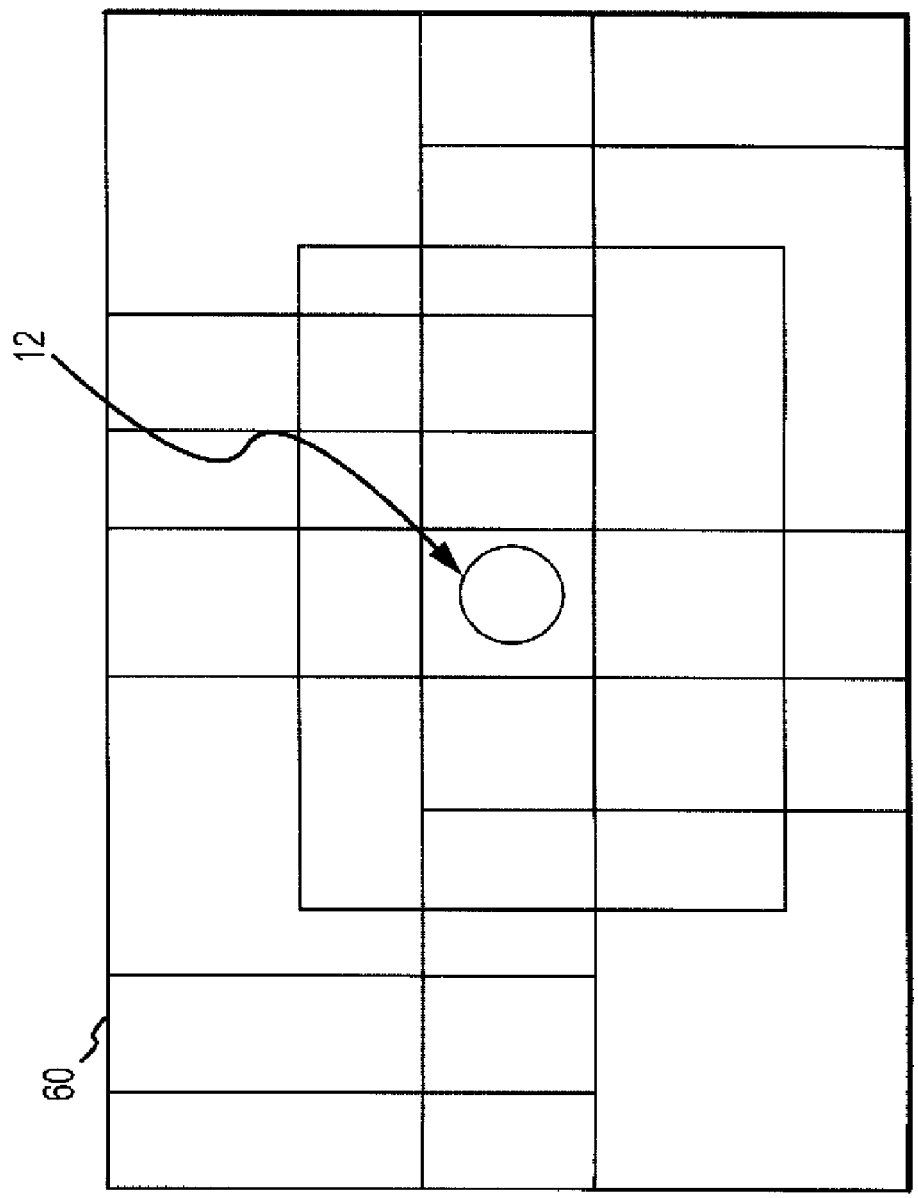
FIG. 5 is a diagram illustrating the registration of the input images to the target.
Figure 7:
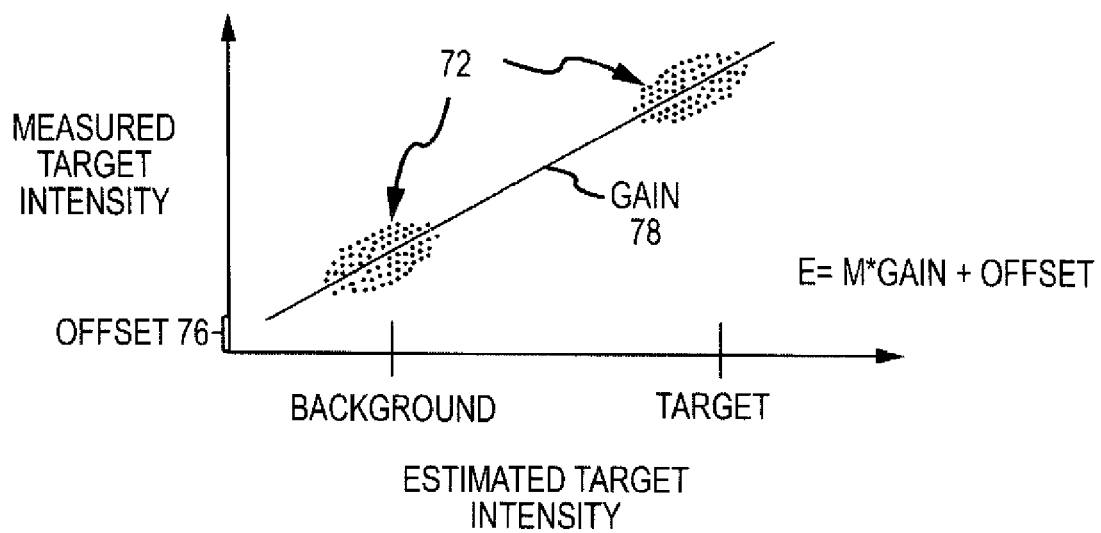
FIG. 7 is a plot for a single imager pixel of the measured pixel response versus the estimated ideal pixel response for at least one target and at least one background intensity level and of the $N^{th}$ order fit to the pixel data.
Figure 8:
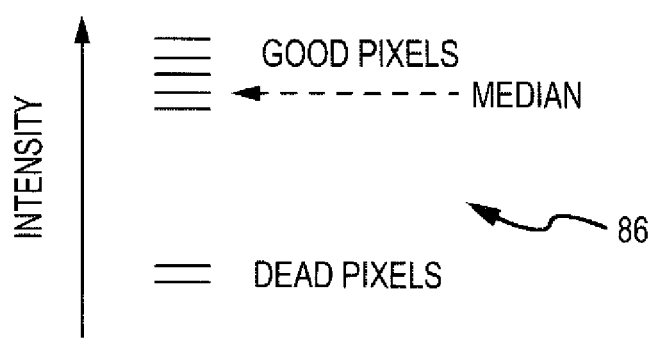
FIG. 8 is a diagram of a median filter for removing outlier image pixels from the computation of the registered average image.
Figure 9:
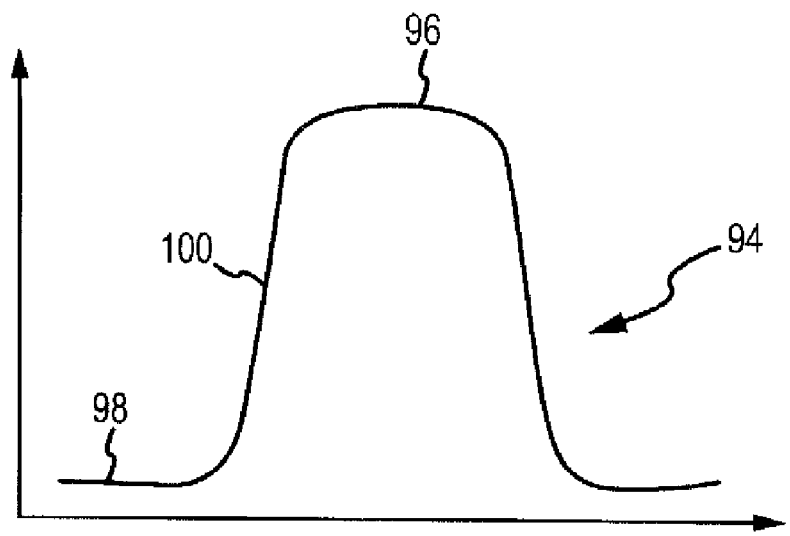
FIG. 9 is an intensity plot through a section of the target and background.
Figure 10:
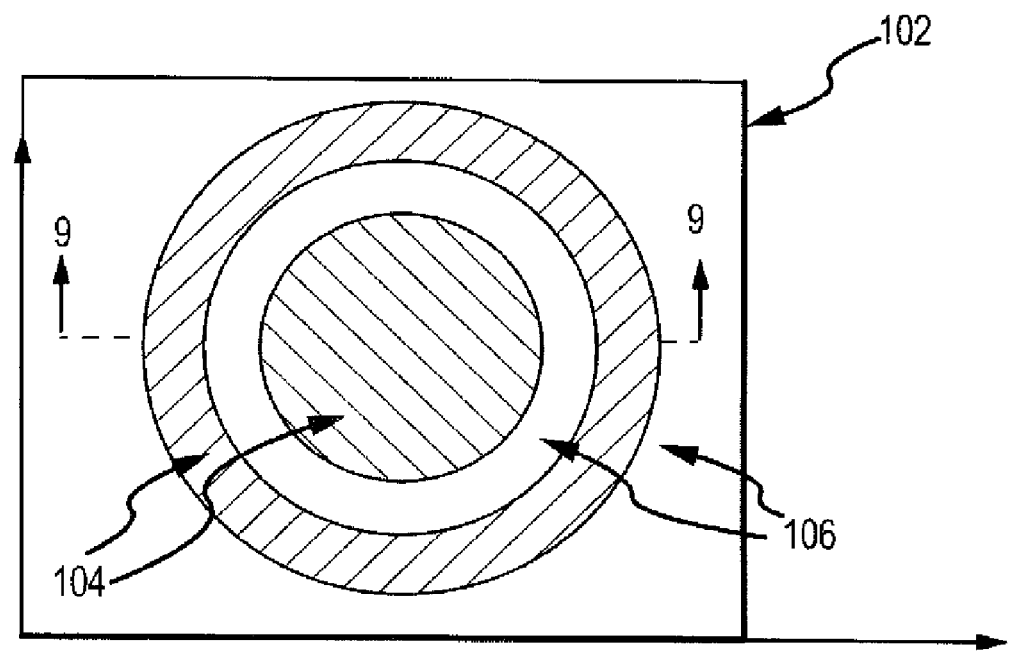
FIG. 10 is a mask that includes pixels in a uniform center target region and a uniform annular background region and excludes pixels in the non-uniform transition region and the remaining portion of the background.

The basic process implemented by computer 42 to generate the scene estimate, estimated target images and estimated NUC terms for a single iteration is illustrated in FIGS. 4 through 7. The process uses the sequence of scanned target images to cross-reference multiple measurements of each pixel of a test scene as viewed by different pixels in the imager; each fully-compensated imager pixel sees multiple different scene pixels and each scene pixel is seen by multiple fully compensated imager pixels. The process then extracts precision NUC terms from the cross-referenced imager and scene pixel data. As described above, the process may be limited to interior target images until the final iteration. The process will be described for fully-compensated imager pixels that meet a given criteria, e.g. an imager pixel that images at least three background and at least three target intensity levels is 'fully-compensated'. Depending on the scan pattern certain edge or other pixels may not satisfy this criterion. The enhanced process which entails keeping track of the variability in the forward mapping (creating the estimate of the test scene) is illustrated in FIGS. 4 and 8 and/or backward mapping (estimating the ideal target images) is illustrated in FIGS. 4 and 9-10 and weighting those imager and/or scene pixels with less variability more heavily. The enhanced process is effective to speed convergence to more precise NUC terms.

Computer 42 receives the compensated target images 60 generated in step 44 and registers them to the target 12 in the test scene (step 62). In general, a sufficient number of properly placed images must be registered to provide desired imager pixels that satisfy the criterion to be fully-compensated. Typically, all of the interior target images will be registered. As mentioned previously, in the case of over scanning the imager FOV to fully compensate pixels near the edges of the FOV, the edge target frames may be incorporated and registered at this point but better results are achieved by only incorporating them to provide additional data pairs to calculate the final NUC terms. The computer then filters the registered images 60 to generate an estimate of the ideal test scene as if the imager pixel NUC terms were perfectly calibrated (referred to herein as the "registered average image" 64) (step 66). The region of registered average image 64 outside the area of the test scene 10 (i.e. the target and a limited portion of the background) is suitably windowed and discarded for further processing. At this point, the computer suitably normalizes the registered average image (step 68) to prevent the offset terms from drifting if this process is iterated. The image is suitably normalized by forcing the average background pixel intensity level to zero and then forcing the average difference between target pixel intensity level and the background pixel intensity level to a constant. This serves to fix the contrast of the images.

The registered average image 64 is backward mapped to the different target placements in the imager FOV to create an estimated target image 69 for each target image (step 70). Backward mapping amounts to using the FOV motion to copy the registered average image 64 back to the appropriate location in the imager so that the target image 30 and the estimated target image 69 are properly registered. If the regions outside the test scene are not discarded during processing, backward mapping amounts to cutting out the appropriate full-sized image from the collage (registered average image). Each estimated target image is an estimate of what the imager pixel responses should have been assuming perfect calibration.

At this point, each fully-compensated imager pixel will have associated with it data pairs 72 (target estimate, target measured) that represent the estimated ideal and measured pixel response for different scene pixels including at least one and preferably multiple background scene pixels, and at least one and preferably multiple target scene pixels, e.g. the required samples to satisfy the criterion for fully-compensated. The multiple target pixels suitably have intensity levels that lie within a first range about a nominal target level and the multiple background pixels suitably have intensity levels that lie within a second range about a nominal background level. For each fully-compensated imager pixel, computer 22 performs an $N^{th}$ order correlation (step 74) on the data pairs to estimate non-uniformity calibration (NUC) terms 50 for the imager to make the measured data fit the estimated data such that all fully-compensated pixels provide substantially the same response to the same input intensity level. In general, all lower order terms are provided by an $N^{th}$ order correlation. For an arbitrary $N^{th}$ order correlation, the target will require N different nominal intensity levels; hence a $1^{st}$ order correlation to extract gain terms only needs a single target intensity level. A $1^{st}$ order correlation generates both the offset and gain terms. For example, to a $1^{st}$ order E=M*Gain+Offset (or equivalently E=(M−Offset)*Gain) where M is the measured pixel response, E is the estimate of the ideal pixel response and the Gain is the slope of the linear approximation. The $1^{st}$ order correlation entails, for example, performing a standard minimum mean squared error (MMSE) fit of the data to this equation to estimate the Gain and Offset terms 76 and 78, respectively.

The enhanced process which entails keeping track of the variability in the forward mapping and weighting those fully compensated imager pixels with less response variability more heavily to create the estimate of the test scene in the form of registered average image 64 is illustrated in FIGS. 4 and 8. In general, the computer forms an unexplained difference image 79 between each compensated target image 60 and the corresponding estimated target image 69 (step 80) where a difference value is the difference in intensity levels. Each difference image corresponds to a different section of the imager. Because of the overlapping scan pattern each fully compensated imager pixel will have multiple difference values associated with different target and background scene pixels from different difference images. The computer computes a variability measure of the difference values for each imager pixel (step 82) and stores the measure in an image pixel stationarity map 84. Pixels that respond consistently will be assigned a small variability and pixels such as "blinkers" or 'dead' pixels that respond inconsistently relative to the input will be assigned a larger variability. Weights $W_{ij}^I$ for each imager pixel are then derived from the stationarity map 84. For example, if the measure of variability is the variance of the imager pixel response, the weight is generally inversely proportional to the standard deviation. The weight may be the reciprocal of the standard deviation or some function thereof. It follows that imager pixels that exhibit a higher degree of stationarity, e.g. a lower variance, are assigned a larger weight and vice-versa. The weights may be biased by adding a constant value to the standard deviation. This is done to keep the weight above the noise level when only a few scene pixels contribute to the imager pixel. Furthermore, the constant is set to a large enough value to assure convergence to a set of NUC terms. The map, hence the weights are typically but not necessarily initialized to a uniform set of values to start the iterative process. When the filtering operation is performed in step 66, for each scene pixel, the contributing imager pixel responses are weighted and summed together and normalized by the sum of the contributing weights. The iterative process will identify the good and bad imager pixels and will rebalance the weights accordingly. The result is that the registered average image 64 is a better estimate of the ideal target image assuming ideal NUC terms.

To further improve convergence and the precision of the NUC terms, during at least the $1^{st}$ iteration (before the imager pixel stationarity map can be updated) instead of applying a uniform set of weights the computer preferably applies a non-linear filter such as a median filter 86 to each scene pixel to reject at least some outlier values. These outlier scene pixels often correspond to bad or dead imager pixels. Removing these values up front has been found to speed convergence of the NUC terms. The median filter may be used for more than just the $1^{st}$ iteration until the stationarity map has converged to identify the good and bad imager pixels.

The enhanced process which entails keeping track of the variability in the backward mapping and assigning larger weights to those scene pixels with less variability is illustrated in FIGS. 4, 9 and 10. In general, the computer computes the variance at each scene pixel in the registered average image (step 90) to form a scene pixel stationarity map 92. The variance at each scene pixel is the variance of the registered imager pixels that contribute to each scene pixel. To a lesser but still significant extent, this map also incorporates the effects of bad imager pixels such as "blinkers", and thus the computed variance is preferably weighted by the imager pixel weights. In the degenerate case this consists of including only those image pixels which were deemed not to be "dead". Assuming an ideal imager pixel response, the scene variance map accounts for any spatial variations in the test scene itself that interact through backward-mapping registration errors to produce variances. There are no temporal variations because the test scene is fixed. Weights $W_{ij}^S$ for each scene pixel are then derived from the stationarity map 92 using, for example, the same approach as for the imager pixel weights. These scene pixel weights are then used to weight the contributions of the scene pixels when the $N^{th}$ order correlation is performed in step 74 to fit the estimated and measured pixel response data for each imager pixel. The weights will skew the MMSE calculation towards finding NUC terms to fit the 'good' scene pixels and away from the 'bad' scene pixels. In the extreme case, the excluded pixels are not considered at all. The weights may also be used to weight the contributions of the difference values when computing the variances for the imager pixel stationarity map. The theory being that an error associated with a 'bad' scene pixel may be because of the scene pixel and not variability in the imager pixel response. The iterative process will identify the stationary and non-stationary portions of the scene, and will rebalance the weights accordingly. The result is that the NUC terms and possibly the image pixel stationary map are based more on good scene pixels and less on bad scene pixels.

To further improve convergence and the precision of the NUC terms, a priori knowledge of the test scene, i.e. areas that are likely to exhibit low and high variability and particular intensity levels, may be used to mask the scene pixels to remove areas that are likely to exhibit high variability and to select the number of target and background pixels (step 93). As shown in FIG. 9, a cross-section 94 of the test scene intensity levels reveals that interior target pixels 96 and exterior target pixels 98 are fairly uniform (near the respective nominal values) whereas transition pixels 100 between the target and background have considerable variability. As shown in FIG. 10, a mask 102 includes 'included' regions 104 (shaded) and 'excluded' regions 106 (not shaded). The scene pixels in excluded regions are presumed a priori to be 'bad' scene pixels. The number of 'included' pixels may be further limited by computing a local gradient within the included regions 104. If the gradient at a given pixel exceeds a threshold, that pixel is excluded and its weight forced to zero. The inherent accuracy of the backward mapping is limited by the gradient multiplied by the registration error and the registration error is typically limited by the quantization of the registration. It follows that the backward mapping is improved by limiting it to pixels with low gradients. If the number of excluded pixels is too high, the best excluded pixels may be re-included to have enough pixels for processing.

The mask can be applied during step 93 either to the scene pixel stationarity map 92 or to the registered average image 64 (or to the image data at any point thereafter). In the former case, all of the image data is processed as before and the weights are applied when performing the $N^{th}$ order correlation or when computing the imager pixel variance. The weights in the excluded regions are zero so the scene pixel data is ignored. The weights in the included regions may be forced to one (or any constant) or allowed to vary as the process iterates based on individual scene pixel response described above. In the later case, the image data in the excluded regions is simply removed or ignored. This has two primary benefits. First, the computer does not have to continue to process scene pixel data from the excluded regions, which improves computational efficiency. Second, in step 68 only data from included regions is normalized. If the entire registered average image is normalized and then the excluded image data removed the normalization is likely to be off.

Following the later approach, masking excludes regions of the test scene so that the estimated target images 69 effectively only include pixel data on the interior of the target and in the annular ring around the target outside the transition area. The pixel data in the excluded transition area and remainder of the background is effectively gone. Consequently, unexplained difference images 79 will only include difference values in the interior and the annular ring. The excluded values could be carried forward but will not be used to compute imager pixel variance in step 82. Similarly, only pixel data in the included regions will be correlated to the measured pixel response data from the target images in step 74.

The overall effect of the forward and backward enhanced procedures is that iterating the process will identify 'good' and 'bad' imager pixels and rebalance the imager pixel weights accordingly and will identify 'stationary' and 'non-stationary' portions of the scene, and will rebalance the scene pixel weights accordingly. Together (or separately) these enhanced procedures both speed and ensure convergence to precision NUC terms.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of calibration of non-uniformity compensation (NUC) terms for a pixilated imager, comprising:
   a) providing a test scene having a target in a background at different intensity levels;
   b) scanning the test scene across the imager field of view (FOV) to generate a sequence of target images in which the test scene is repeated in an overlapping pattern at different target placements across the imager FOV so that each fully compensated imager pixel images at least one target intensity level and at least one background intensity level;
   c) registering the sequence of target images to the target to create a sequence of registered target images;
   d) filtering the registered target images to form a registered average image;
   e) backward mapping the registered average image to the different target placements in the imager FOV to create an estimated target image for each target image;
   for each fully compensated imager pixel, performing an $N^{th}$ order correlation of the target image intensity levels to the estimated target image level intensity levels for different target and background test scene pixels imaged by that imager pixel to estimate at least gain non-uniformity compensation (NUC) terms for the imager such that fully compensated imager pixels provide approximately the same response to the same scene intensity level; and
   g) storing at least gain NUC terms as calibration weights for the imager.

2. The method of claim 1, further comprising:
   h) applying the NUC terms to the sequence of target images to generate a sequence of compensated test images; and
   i) repeating steps (c)-(f) on the sequence of compensated test images at least once.

3. The method of claim 2, wherein the test scene is scanned across and beyond the imager FOV so that pixels within the imager FOV and near its edges are fully-compensated imager pixels.

4. The method of claim 3, wherein said sequence of target images includes interior target images in which the target is fully contained within the imager FOV and edge target images in which only a only a limited portion of the target is contained within the imager FOV, wherein at steps (c)-(f) and (h) are performed on only the interior target images until the last iteration at which time the edge target images are incorporated to provide additional target image intensity levels for imager pixels near the edges of the imager FOV and the Nth order correlation is performed on all fully-compensated imager pixels to provide NUC terms for all fully-compensated imager pixels.

5. The method of claim 1, wherein the test scene is provided and scanned across the imager in a test chamber, further comprising performing moving target testing of the calibrated imager in the same test chamber.

6. The method of claim 1, wherein in said test scene said target has an included region of pixels whose intensity levels lie within a first range about a first nominal value and said background has an included region of pixels whose intensity levels lie within a second range about second nominal value.

7. The method of claim 1, further comprising collimating the light from the test scene.

8. The method of claim 1, wherein in step (d) for at least a first iteration a non-linear filter is applied to each scene pixel to reject at least one outlier intensity level to form the registered average image.

9. The method of claim 1, further comprising computing a variability of the intensity level response of each fully compensated imager pixel to different scene pixels and weighting the contribution of each imager pixel to form the registered average image in step (d) based on that variability.

10. The method of claim 9, wherein the variability of each fully compensated imager pixel is tracked by,
computing an unexplained difference image including an array of intensity difference values by comparing the intensity levels of each estimated target image to its corresponding target image;
identifying the difference values from the difference images corresponding to the imager pixel; and
computing the variability from the identified difference values.

11. The method of claim 9, wherein the NUC terms are applied to the sequence of target images and steps (c)-(f) repeated at least once, wherein for at least a first iteration a non-linear filter is applied to each scene pixel to reject at least one outlier intensity level to form the registered average image and wherein for at least a subsequent iteration the intensity level contribution of each fully compensated imager pixel is weighted based on its variability to form the registered average image.

12. The method of claim 1, further comprising:
assigning weights to the scene pixels that are not all the same; and
weighting the contribution of each scene pixel by the assigned weight in the performance of the $N^{th}$ order correlation.

13. The method of claim 12, wherein the weights are assigned according to a spatial mask that in part excludes regions of the test scene including a transition region between the target and the background and in part includes regions of the test scene including a first region within the target and a second region in the background.

14. The method of claim 13, wherein pixels in the excluded region are assigned weights of zero.

15. The method of claim 14, further comprising computing a gradient of the intensity levels of the scene pixels in the included regions, comparing the gradient of each scene pixel to a threshold, and for any scene pixels whose gradient exceeds the threshold assigning that scene pixel a weight of zero.

16. The method of claim 14, wherein pixels in the included regions are assigned constant weights.

17. The method of claim 14, further comprising computing a variability of each scene pixel in the included regions and assigning weights to each said scene pixel based on its variability.

18. The method of claim 1, further comprising applying a spatial mask to the registered average image that in part excludes a transition region between the target and the background and in part includes a first region within the target and a second region in the background.

19. The method of claim 1, further comprising:
computing a first variability of the response of each fully compensated imager pixel to different scene pixels and weighting the contribution of each imager pixel to form the registered average image based on that variability; and
computing a second variability of each scene pixel from different imager pixels and weighting the contribution of each scene pixel in the performance of the $N^{th}$ order correlation based on the variability.

20. The method of claim 19, wherein the computation of the first variability is a function of the second variability for each of the different scene pixels and the computation of the second variability is a function of the first variability for each of the different fully compensated imager pixels.

21. The method of claim 1, further comprising windowing the registered average image to discard imagery outside the test scene.

22. A system for calibration of non-uniformity compensation (NUC) terms for a pixilated imager, comprising:
A test chamber;
A pixilated imager in the test chamber;
A test scene inside said test chamber, said test scene having a target in a background at different intensity levels;
A collimator that collimates light from the test scene;
A scanning mirror that scans collimated light from the test scene across the imager field of view (FOV) to generate a sequence of target images in which the test scene is repeated in an overlapping pattern at different target placements across the imager FOV so that each fully compensated imager pixel images at least one target intensity level and at least one background intensity level;
A computer configured to receive and process the sequence of target images to calibrate at least gain NUC terms and store the gain NUC terms within the imager, said computer configured to register the sequence of target images to the target to create a sequence of registered target images, filter the registered target images to form a registered average image, backward map the registered average image to the different target placements in the imager FOV to create an estimated target image for each target image, and for each fully compensated imager pixel, perform an $N^{th}$ order correlation of the target image intensity levels to the estimated target image level intensity levels for different target and background test scene pixels imaged by that imager pixel to estimate at least gain non-uniformity compensation (NUC) terms for the imager such that fully compensated imager pixels provide approximately the same response to the same scene intensity level.

23. The system of claim 22, wherein said computer is configured to apply the NUC terms to the sequence of target images to generate a sequence of compensated test images and repeat the process on the sequence of compensated test images at least once.

24. The system of claim 23, wherein for at least a first iteration the computer is configured to apply a non-linear filter to each scene pixel to reject at least one outlier intensity level to form the registered average image.

25. The system of claim 22, wherein said is configured to assign weights to the scene pixels that are not all the same and weights the contribution of each scene pixel by the assigned weight in the performance of the $N^{th}$ order correlation.

26. The system of claim 25, wherein the computer is configured to assign the weights according to a spatial mask that in part excludes regions of the test scene including a transition region between the target and the background and in part includes regions of the test scene including a first region within the target and a second region in the background.

27. The system of claim 22, wherein the is configured to apply a spatial mask to the registered average image that in part excludes a transition region between the target and the background and in part includes a first region within the target and a second region in the background.

28. The system of claim 22, wherein the computer is configured to compute a first variability of the response of each fully compensated imager pixel to different scene pixels and weight the contribution of each imager pixel to form the registered average image based on that variability, and compute a second variability of each scene pixel from different imager pixels and weight the contribution of each scene pixel in the performance of the $N^{th}$ order correlation based on the variability.

\* \* \* \* \*